United States Patent [19]

Hammer et al.

[11] 4,431,444
[45] Feb. 14, 1984

[54] PROCESS FOR REDUCING THE IRON CONTENT OF CAO-RICH SLAGS FORMED DURING THE DESULPHURIZATION OF CRUDE IRON

[75] Inventors: Rudolf Hammer, Dinslaken; Walter Meichsner, Krefeld; Heinrich Rellermeyer, Duisburg, all of Fed. Rep. of Germany

[73] Assignee: SKW Trostberg AG, Trostberg, Fed. Rep. of Germany

[21] Appl. No.: 401,209

[22] Filed: Jul. 23, 1982

[30] Foreign Application Priority Data

Jul. 27, 1981 [EP] European Pat. Off. ............ 81105910

[51] Int. Cl.³ ............................ C21C 1/00; C21C 1/02
[52] U.S. Cl. ............................................. 75/53; 75/54
[58] Field of Search ........................................ 75/51-58

[56] References Cited

U.S. PATENT DOCUMENTS

| 3,423,202 | 1/1969 | Ledune | 75/52 |
| 3,687,435 | 8/1972 | Hager | 75/52 |
| 3,820,768 | 6/1974 | Sieckman | 75/52 |
| 3,827,880 | 8/1974 | Greeson | 75/52 |

Primary Examiner—Peter D. Rosenberg
Attorney, Agent, or Firm—Sprung, Horn, Kramer & Woods

[57] ABSTRACT

A process is described and claimed for reducing the iron content of a CaO-rich slag which is formed during the desulphurization of molten crude iron which comprises adding finely-ground fluorspar to the melt, in the ladle, or adding it to the lade prior to adding the crude iron thereto, in an amount such that the slag is not rendered fluid.

7 Claims, No Drawings

PROCESS FOR REDUCING THE IRON CONTENT OF CAO-RICH SLAGS FORMED DURING THE DESULPHURIZATION OF CRUDE IRON

BACKGROUND OF THE INVENTION

1. Field of the Invention

The invention relates to a process for reducing the iron content of CaO-rich slags formed during the desulphurization of crude iron. This invention also relates to a process for decreasing encrustations on the walls of ladles used in hot metal desulphurization.

2. Discussion of Prior Art

For many decades, crude iron has been desulphurized outside the blade furnace. In the earlier years, this was effected, in the main, by adding soda during the operation in which the crude iron is tapped from the blast furnace and run off into the transport ladles. In more recent years, crude iron desulphurization by the immersion-lance process has increasingly gained acceptance. In this process, the desulphurizing agents, e.g. calcium carbide or lime, are blown in with the aid of a lance which is plunged into the bath of crude iron. This blowing-in can be carried out in the ladle, in which the crude iron is transported from the blast furnace to the steelmaking unit.

The total costs of the so-called "external" crude iron desulphurization treatment, that is to say, the treatment performed outside the melting unit, are increased to a considerable extent by the losses of iron during the desulphurization treatment. Large quantities of finely-dispersed iron droplets are formed in the desulphurization slag, which apparently fail to coagulate to form larger drops, and which are accordingly unable to flow back into the bath of crude iron, but remain included within the slag. As a result of this, the crude iron desulphurization process is rendered very much less economic.

It has already been proposed to recover the iron from the desulphurization slag (German Patent Specification No. 750,334). However, this procedure for recovering iron from the desulphurization slag represents only a makeshift remedy. The iron is initially withdrawn from being directly further processed, and must be remelted after the recovery process.

When soda-free desulphurizing agents are used, the high iron contents in desulphurizing slags which are rich in CaO also lead to situations in which, when comparatively long delay times occur between the treatment of the melt and the emptying of the ladle, the slag, which is present in an essentially solid condition, forms comparatively large lumps as a result of the cooling and solidification of the iron which it contains. These lumps cake onto the wall of the ladle, and can be removed from the ladle only with difficulty. Especially in the case of torpedo ladles, this caking-on effect prevents the slag from flowing out with the crude iron, and an undesirable accumulation of slag occurs in the ladle, which reduces the usable ladle capacity. In order to prevent this effect, processes for removing slag deposits, occurring in the transport ladles during the desulphurization of crude iron, have been disclosed (German Patent Specification No. 2,247,475), but these processes have not proved successful.

It is an object of this invention to provide a process which keeps the iron content of the CaO-rich slags formed during the desulphurization of crude iron as low as possible, i.e., which inhibits migration of the iron into the slag. At the same time, it is an object of the invention to prevent the formation of slag deposits in the desulphurizing vessel.

SUMMARY OF THE INVENTION

This object is achieved, according to the invention, when finely-ground fluorspar is added to the melt, in the ladle, in an amount such that the slag is not rendered fluid. Depending on the degree of desulphurization, the amount of slag, and the composition of the slag, the amount of fluorspar added preferably lies in the range from 0.05 to 1.5 kg per metric ton of crude iron. The fluorspar addition is limited to an amount at which the slag is not rendered fluid. If only a small amount of slag forms during the desulphurization operation, the amounts of fluorspar employed lie on the lower limit, and correspondingly high fluorspar additions are appropriate when larger amounts of slag are formed. The fluorspar is preferably added by blowing it into the crude iron melt.

Preferably fluorspar is added to the melt before desulphurizing of the melt. Adding of fluorspar may be performed in two ways:

When desulphurization is performed in an open ladle the fluorspar is put on the surface of the crude iron melt before commencement of the desulphurization treatment. Afterwards the desulphurizing agents are blown into the crude iron melt. The resulting CaO-rich desulphurizing slag rises up to the surface of the crude iron melt and meets there with the fluorspar which was added before.

If the desulphurizing takes place in a torpedo ladle, the fluorspar can be introduced into the empty ladle. During pouring of the crude iron melt into the torpedo ladle the fluorspar is uniformly distributed within the crude iron melt. Afterwards the desulphurizing agents are blown into the crude iron melt. The resulting CaO-rich desulphurizing slag meets with the fluorspar being uniformly distributed in the melt when rising up to the surface of the crude iron melt.

EXAMPLE

In the text which follows, the invention is explained by reference to an illustrative embodiment.

In the desulphurization of a crude iron melt, without applying the process according to the invention, the desulphurizing slag contained, on the average, 42.0% Fe, the applicable basicity number ($CaO:SiO_2$) being 4.3.

As a result of blowing in 0.25 kg of fluorspar, with a particle-size in the range up to 0.5 mm, per metric ton of crude iron, it was possible to detect a reduction in the iron content, to approximately 10%, the basicity number meanwhile remaining the same. At the same time, the accumulation of slag, in the ladle, decreased, so that it was possible to increase the quantity of crude iron transported per journey by an average of approximately 10%. The fluorspar used was substantially free from the usual barium sulphate impurities.

It was surprising, to those skilled in the art, that the addition of fluorspar, in an amount below the concentration necessary for fluidizing the CaO-rich slags, leads to a pronounced reduction in the iron content of the desulphurizing slag. In the case of the amounts added, the desulphurizing slag even becomes still "drier", that is to say, more powdery, and consequently does not cake on cooling, and also adheres less to the vessel wall.

We claim:

1. A process for reducing the iron content of a CaO-rich slag formed during the desulphurization of a crude iron melt, which comprises adding finely-ground fluorspar to the melt, in a ladle in which the crude iron is transported to a steel making unit, or adding it to the ladle prior to adding the crude iron thereto, in an amount such that the slag remains solid.

2. Process according to claim 1 wherein fluorspar is added, to the melt, in an amount from 0.05 to 1.5 kg per metric ton.

3. Process according to claim 1 wherein the fluorspar is blown into the crude iron.

4. Process according to claim 2 wherein the fluorspar is blown into the crude iron beneath the level of the molten metal.

5. Process according to claim 1 wherein the fluorspar is added to the melt before desulphurizing of the melt.

6. Process according to claim 5 wherein the fluorspar is added to the ladle prior to adding molten metal thereto.

7. Process according to claim 5 wherein the fluorspar is distributed over the surface of the molten metal prior to commencement of desulphurization.

* * * * *

UNITED STATES PATENT AND TRADEMARK OFFICE
CERTIFICATE OF CORRECTION

PATENT NO. : 4,431,444
DATED : February 14, 1984
INVENTOR(S) : Rudolf Hammer et al It is certified that error appears in the above-identified patent and that said Letters Patent is hereby corrected as shown below:

Title Page                     Delete "Assignee" and insert
                               --Thyssen Aktiengesellschaft vorm.
                                 August Thyssen-Hütte
                                 Duisburg, Germany,          and SKW Trostberg AG
                                 Trostberg, Germany    --

Title Page, Title,             Delete "CAO" and insert --CaO--
   2nd line

Col. 1, line 2                 Delete "CAO" and insert --CaO--

Signed and Sealed this

*Eleventh* Day of *December 1984*

[SEAL]

*Attest:*

GERALD J. MOSSINGHOFF

*Attesting Officer*    *Commissioner of Patents and Trademarks*